G. R. RICH.
CHUCK.
APPLICATION FILED NOV. 5, 1910.
1,065,274.
Patented June 17, 1913.
2 SHEETS—SHEET 1.
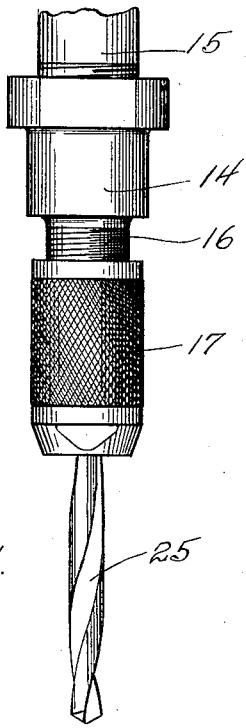
Fig. 1.
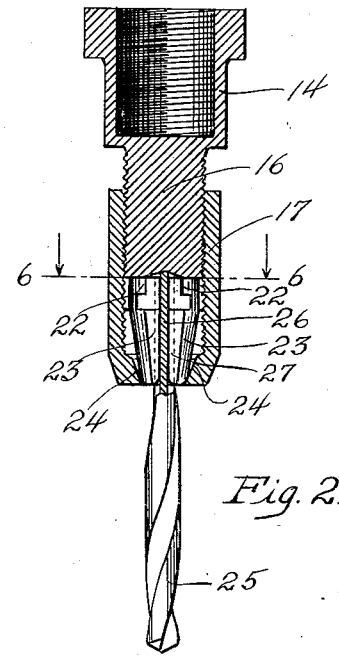
Fig. 2.
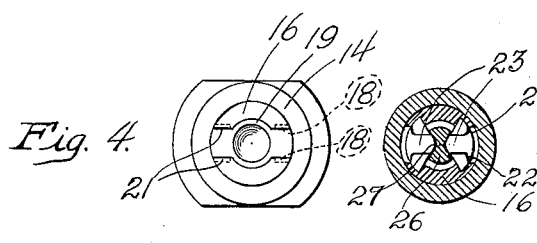
Fig. 4.   Fig. 6.
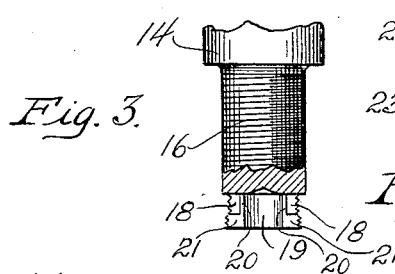
Fig. 3.
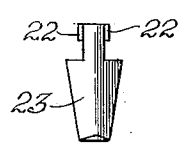
Fig. 7.
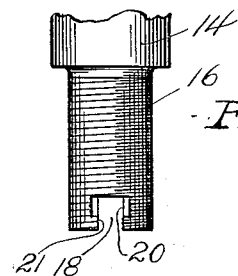
Fig. 5.
Witnesses:
Ephraim Banning.
Wm P Bond
Inventor:
George R. Rich.
By 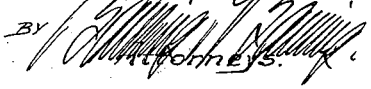
Attorneys.

G. R. RICH.
CHUCK.
APPLICATION FILED NOV. 5, 1910.

1,065,274.

Patented June 17, 1913.

2 SHEETS—SHEET 2.

Witnesses:
Ephraim Banning.
Wm F. Bond.

Inventor:
George R. Rich

By Banning & Banning
Attorneys.

COLUMBIA PLANOGRAPH CO., WASHINGTON, D. C.

UNITED STATES PATENT OFFICE.

GEORGE R. RICH, OF CHICAGO, ILLINOIS, ASSIGNOR TO RICH TOOL CO., OF CHICAGO, ILLINOIS, A CORPORATION OF ILLINOIS.

CHUCK.

1,065,274.        Specification of Letters Patent.        Patented June 17, 1913.

Application filed November 5, 1910. Serial No. 590,840.

*To all whom it may concern:*

Be it known that I, GEORGE R. RICH, a citizen of the United States, residing at Chicago, in the county of Cook and State of Illinois, have invented certain new and useful Improvements in Chucks, of which the following is a specification.

This invention relates to chucks designed and more especially adapted for holding drills, reamers and the like and relates more particularly to the means for holding tools within the chuck.

One object of the present invention is to provide a cheap, simple and efficient means for locking the tool.

Another object is to form said locking members so that said members may be readily removed and replaced if they become worn or broken.

Another object is to provide means for holding the tool in the chuck by means of jaws that engage in a tool having longitudinally extending grooves.

Another object resides in mounting the jaws in the chuck in such a manner that they tend to swing apart when not under compression, thus permitting the easy insertion and withdrawal of the tool.

Another object is to provide a chuck whose jaws engage in substantially V-shaped grooves of a tool which construction permits said jaws to grip said tool with an equal pressure on each side thereof and at the same time causes the tool to be centered absolutely with respect to the chuck.

Another object is to provide movable locking members so formed and mounted as to permit only of compression inwardly, and that so regulated as to prevent the possibility of said members being displaced from their mountings by traveling too far either inwardly or outwardly; and a further object of this invention resides in the means for gripping the tool which permits the use of tools of almost any formation of head, it being merely necessary for said head to be formed with a groove.

The invention further consists in the features of construction and combination of parts hereinafter described and claimed.

Figure 8:
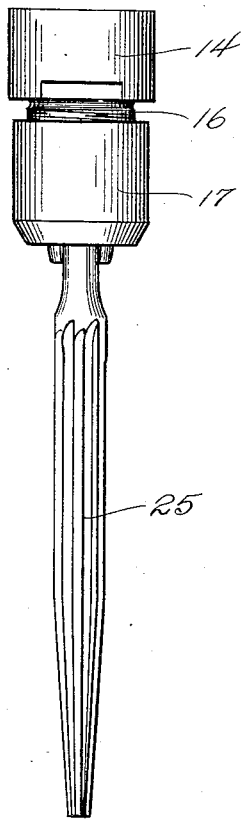
Figure 9:
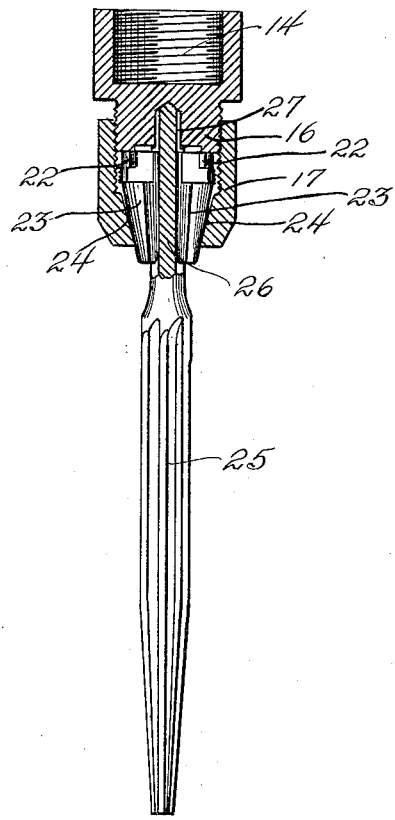
Figure 10:
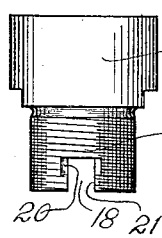
Figure 12:
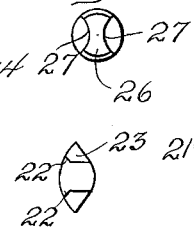
Figure 11:
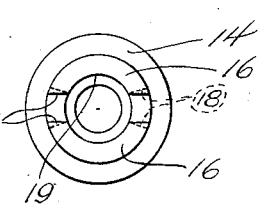
Figure 13:

In the drawings Figure 1 is a side elevation of the chuck of the present invention, showing a tool inserted therein; Fig. 2 a longitudinal section of the chuck showing the jaws in gripping position against the tool; Fig. 3 a side elevation with the shank of the chuck partially broken away to show the seats in which the jaws are mounted; Fig. 4 shows an end view of the parts shown in Fig. 3 showing more particularly the T-shaped slots in which the upper ends of the jaws rest; Fig. 5 a side elevation of the shank showing the T-shaped slots therein; Fig. 6 a cross-section on lines 6—6 of Fig. 2 looking in the direction of the arrows; Fig. 7 a front view of one of the jaws; Fig. 8 a side elevation of a slightly modified form of the chuck showing a tool inserted therein; Fig. 9 a longitudinal section of Fig. 8 showing the jaws in gripping position against the tool; Fig. 10 a side elevation of the shank of the form of chuck shown in Fig. 8 showing the T-shaped slots therein; Fig. 11 an end view of the shank shown in Fig. 10; Fig. 12 an end view of a tool of a form adapted to be held in the chuck; and Fig. 13 an end view of the form of jaws shown in Fig. 9.

The chuck as a whole comprises a head 14 adapted to be attached to a spindle 15 of a drilling machine of any ordinary and well known type. Since the present invention does not concern itself with drill presses an illustration and description of the same is not deemed necessary here, but it is to be understood, of course, that this chuck is adapted to be used with any type of drill press. The head 14 has a shank 16 of reduced diameter having an externally screw-threaded surface adapted to receive a sleeve 17 having an internally screw threaded surface; the shank 16 of the chuck has at its lower extremity T-shaped slots 18 as best shown in Figs. 3 and 4; said slots are located diametrically opposite one another and terminate in an interior chamber 19 formed centrally in the shank. Shoulders 20 are formed in the slots 18 adjacent the inner chamber 19 and extend outwardly along the lower edge of the slots as at 21, adapted to support thereon corresponding shoulders 22 of the jaws 23; the shoulders 22 are positioned at the head of the jaws 23 along its outer face; because of this location of the shoulders 22 on the jaws 23 the preponderance of weight on said jaw is forward of said shoulders, and the resulting tendency is that said jaws swing apart from each other at their lower ends by the action of gravity. The only movement of the shoulders 22 of said jaws in the T-slot 18 is on the shoulders 21 and this movement is limited outwardly by the sleeve 17 and inwardly by the shoulders 20 so when a tool has been withdrawn from the chuck no displacement of the jaws can occur. The threaded sleeve 17 which is connected to the shank 16 of the head 14 has on its lower portion of its inner wall a tapered surface 24 adapted to engage with the outer surface of the jaws 23. As this sleeve is moved up upon the shank 16 the tapered surface 24 engages with the jaws 23. The tapering surface during this operation is continually presenting a smaller circumference to the outside of the jaws with the result that said jaws are forced inward against the tool 25 and tighten their grip thereon. Likewise when the sleeve 17 begins its downward movement, upon the shank 16 the small circumference of the tapered surface which has been abutting against the jaws 23 is increasing continually thereby allowing the jaws to loosen their hold upon the tool and by the action of gravity already explained before to swing outwardly as far as the circumference of the sleeve permits. The tool 25, here shown as a drill, is provided at its upper end 26 with longitudinally extending grooves 27 preferably as shown, substantially V-shaped in cross section in which seat the jaws 23 thus forming a positive lock against any rotary movement between said jaws, independent of the rotary movement of the tool 25. When the tool is placed in the chuck it is guided between the jaws 23 which on account of their V-shaped formation and the corresponding grooves 27 in the tool automatically centers said tool in the chuck. The manner in which the jaws 23 take their hold upon the tool and impart to it rotation is of special importance. Whichever way the drill press may rotate the jaws are engaging exactly the same in the grooved head of the tool; at least two faces of the jaws, that is one face of each jaw is in close contact with its corresponding face of the V-shaped grooves 27 in the head of tool. The rotating force as imparted to the tool therefore is equal from two directions, that is it is imparted directly from two faces of the jaws to two faces of the grooves in the tool and is not dependent upon the tightness with which jaws are gripping the tool. At the same time additional clutching power is secured by a tight hold of tool by said jaws. Inasmuch as the tapering surface 24 on the interior of the sleeve 17 which compresses the jaws against the tool is always equidistant from the center of the tool, it follows that a tight compression of the jaws by said sleeve against said tool will result in an absolute centering of said tool with respect to the chuck.

I claim:

In a chuck, the combination of a head provided with a lower central bore and with oppositely disposed slots extending from the outer surface of said head to said bore, said slots being of increasing area from a point adjacent the inner termini to the outer edge thereof giving a T-shaped formation to such area and providing vertical and horizontal shoulders in said T-shaped portion, a jaw for each of said slots formed to provide a T-shaped head at the upper end thereof, the horizontal portion of said head being cut away to provide thin oppositely disposed outer shoulders, said shoulders resting against the horizontal shoulders in said slots when the parts are assembled producing an edge-like engagement between the jaws and chuck, the mass of weight of said jaws lying to the inside of said point of engagement, whereby the jaws tend normally to swing outwardly, surfaces on the jaws for engaging the tool, and means for forcing and retaining the jaws in engagement with the tool, substantially as described.

GEORGE R. RICH.

Witnesses:
EPHRAIM BANNING,
WALKER BANNING.